United States Patent
Yamaguchi et al.

(10) Patent No.: US 6,813,237 B2
(45) Date of Patent: Nov. 2, 2004

(54) OPTICAL RECORDING MEDIUM HAVING A PLURALITY OF MEANDERING GROOVE TRACKS, OPTICAL RECORDING MEDIUM PRODUCING APPARATUS AND OPTICAL RECORDING MEDIUM PRODUCING METHOD

(75) Inventors: Atsushi Yamaguchi, Tokorozawa (JP); Masahiro Kato, Tokorozawa (JP); Eiji Muramatsu, Tokorozawa (JP); Seiro Oshima, Yamanashi-ken (JP); Takao Tagiri, Kofu (JP)

(73) Assignee: Pioneer Corporation, Tokyo-To (JP)

( * ) Notice: Subject to any disclaimer, the term of this patent is extended or adjusted under 35 U.S.C. 154(b) by 163 days.

(21) Appl. No.: 09/911,424

(22) Filed: Jul. 25, 2001

(65) Prior Publication Data

US 2002/0015379 A1 Feb. 7, 2002

(30) Foreign Application Priority Data

Jul. 25, 2000 (JP) .................................... P2000-224216

(51) Int. Cl.$^7$ ................................................ G11B 7/24
(52) U.S. Cl. .................................. 369/275.3; 369/275.4
(58) Field of Search .......................... 369/275.3, 275.4, 369/275.2, 277, 278, 13.55; 428/64.4, 64.2, 64.1, 64.3; 386/94, 82; 380/201, 203

(56) References Cited

U.S. PATENT DOCUMENTS

| | | | | |
|---|---|---|---|---|
| 5,572,507 A | * | 11/1996 | Ozaki et al. | 369/275.4 |
| 5,696,757 A | * | 12/1997 | Ozaki et al. | 369/275.4 |
| 6,031,815 A | * | 2/2000 | Heemskerk | 369/275.3 |
| 6,078,559 A | | 6/2000 | Takemura et al. | 369/275.3 |
| 6,418,112 B1 | * | 7/2002 | Kuroda et al. | 369/275.4 |
| 6,438,097 B1 | * | 8/2002 | Kajiyama et al. | 369/275.4 |
| 6,477,124 B2 | * | 11/2002 | Carson | 369/53.21 |
| 6,532,206 B2 | * | 3/2003 | Muramatsu et al. | 369/275.3 |
| 6,535,477 B1 | * | 3/2003 | Muramatsu et al. | 369/275.3 |
| 2001/0008516 A1 | | 7/2001 | Kuroda | 369/275.3 |
| 2001/0014074 A1 | | 8/2001 | Muramatsu et al. | 369/111 |
| 2001/0014077 A1 | | 8/2001 | Muramatsu et al. | 369/275.3 |

FOREIGN PATENT DOCUMENTS

| | | | |
|---|---|---|---|
| EP | 1 054 399 A1 | 11/2000 | |
| JP | 10-172149 A | 6/1998 | |
| JP | 10-172149 | 6/1998 | |
| JP | 10-222874 A | * 8/1998 | 369/275.4 |
| JP | 11-39660 A | * 2/1999 | 369/275.4 |
| JP | 11-066708 | 3/1999 | |
| JP | 2000-021024 | 1/2000 | |
| JP | WO00/07183 | 2/2000 | |

OTHER PUBLICATIONS

"Pioneer Introduces the Industry's First DVD Recorder," XP–002215139. (Press Release, Nov. 25, 1999).

\* cited by examiner

Primary Examiner—Tan Dinh
(74) Attorney, Agent, or Firm—Morgan, Lewis & Bockius LLP

(57) ABSTRACT

The present invention provides an optical recording medium, in which levels of wobble signals extracted from a recording area formed snakily, a reproduction exclusive area and an impossible area are maintained constant. On DVD-RW, groove tracks are snakily formed on a groove section on which recording information is recorded, and pit strings where a plurality of phase pits wave are arranged on the impossible area and the reproduction exclusive area which prevent illegal copying. On the respective areas, pit depths (groove depths), duty of the pit strings and wobbling amplitudes are set according to predetermined conditions so that the output levels of the wobble signals extracted based on the wobbling amplitudes can be maintained constant on the respective areas. As a result, synchronous control can be made accurately at the time of recording and reproduction on/from the DVD-RW.

10 Claims, 14 Drawing Sheets

OPTICAL RECORDING MEDIUM HAVING A PLURALITY OF MEANDERING GROOVE TRACKS, OPTICAL RECORDING MEDIUM PRODUCING APPARATUS AND OPTICAL RECORDING MEDIUM PRODUCING METHOD

BACKGROUND OF THE INVENTION

1. Field of the Invention

The present invention relates to an optical recording medium such as DVD, and particularly relates to an optical recording medium in which recording tracks are formed meanderingly.

2. Description of the Related Art

In recent years, DVD is used as an optical information recording medium with large capacity generally and widely. In addition to Read-only DVD (DVD-ROM), the standard of DVD-RW (DVD-Re-recordable) being capable of recording and reproducing recording information is being laid down. Groove tracks are formed as recording tracks in a predetermined pattern on an optical disc according to the DVD-RW standard. The groove tracks are formed meanderingly so as to be wobbled, and a wobble signal with constant frequency is extracted at the time of recording so as to be capable of being used as a reference signal which synchronizes with rotation of the DVD-RW.

Meanwhile, since recording is possible on DVD-RW, for example, various contents data recorded on DVD-ROM can be illegally copied onto DVD-RW. Contents such as images and music are normally subject to protection of their copyright, and it is requested that illegal copying onto DVD-RW is prevented by a certain method and the copyright is protected effectively.

Therefore, in the standard of DVD-RW (Ver.1.0), measures for preventing illegal copying is defined, namely, predetermined data are previously embedded as emboss pit string (phase pit string) into an area of DVD-RW corresponding to a recording area of DVD-ROM where reproduction control data or the like were recorded. As a result, even if other reproduction control data are overwritten on this area, a reproduction signal of the overwritten data interferes with the reproduction signal of the emboss pit string so as not to be read, and thus other reproduction control data cannot be substantially overwritten.

However, since the area into which the emboss pit string was embedded is equal to that grooves are formed intermittently, an output level of a wobble signal extracted from this area is lower than an output level of a wobble signal extracted from an area of a continuous groove where recording data are recorded, and thus synchronous detection of DVD-RW cannot be executed stably.

SUMMARY OF THE INVENTION

The present invention is devised in order to solve the above problems and it is an object of the present invention to provide an optical information recording medium which is capable of always maintaining a wobble signal based on wobbling of groove tracks in a constant level and realizing stable synchronous control.

The above object of the present invention can be achieved by an optical recording medium of the present invention onto which recording information can be recorded optically. The optical recording medium is provided with: a first area where the recording information is recorded on groove tracks formed meanderingly so as to extract wobble signal; a second area where a phase pit string corresponding to control data required for reproduction control of the recording information is arranged meanderingly, the phase pit string having a pit depth so that it enables the control data to be read and reading of other data overwritten on the phase pit string is prevented; and a third area where a phase pit string corresponding to predetermined data is arranged meanderingly, the phase pit string having a pit depth so that it enables pre-pits including address information representing a recording position on said optical recording medium to be read and reading of other data overwritten on the phase pit string is prevented. In addition, a meandering amplitude of said second area and a meandering amplitude of said third area are set so that output levels of wobble signals extracted from said respective areas are approximately equal to an output level of the wobble signal extracted from said first area.

According to this invention, by using the optical recording medium, the recording information is recorded on the first area and a plurality of phase pits are formed on the second and third areas so as to prevent illegal copying. At this time, since the respective areas have waving forms, the wobble signals can be extracted. On the second and third areas, even if the pit depths are different from each other, since the wobbling amplitudes are set suitably, the output levels of the wobble signals which are substantially equal to the case of the first area as a reference can be obtained. Therefore, the output levels of the wobble signals can be always maintained constant on the different areas of the optical recording medium so that accurate synchronous control can be utilized.

In one aspect of the present invention, the pre-pits are formed at least on said first area and said third area.

According to this aspect, the pre-pits are formed on the areas other than the second area. Therefore, even in the case where the phase pits on the second and third areas are formed into different pit depths, the output levels of the wobble signals can be maintained equal as mentioned above.

In another aspect of the present invention, the pit depth on said third area is set so as to be equal to the depth of the groove tracks of said second area.

According to this invention, the depth of the groove tracks on the first area is equal to the pit depth of the third area. Therefore, the output levels of the wobble signals from the first area and the third area can be maintained equal as mentioned above only by changing the waving amplitudes.

In further aspect of the present invention, on said first area, a depth of the groove tracks is set to 30 nm, on said second area, the pit depth is set to 80 nm, an average duty of the pit string is set to approximately 50%, and the meandering amplitude is set to be approximately 2.7 times as much as that of said first area, and on the third area, the pit depth is set to 30 nm, an average duty of the pit string is approximately 80%, and the meandering amplitude is set to be approximately 1.3 times as much as that of said first area.

According to this invention, suitable design conditions can be given particularly in the case where DVD-RW is used.

In further aspect of the present invention, the meandering amplitude of said third area is set so as to be equal to the meandering amplitude of said first area.

According to this invention, the waving amplitude of the first area is equal to the waving amplitude of the third area. Therefore, the output levels of the wobble signals can be maintained equal as mentioned above only by changing the depth of the groove tracks on the first area and the pit depth of the third area.

In further aspect of the present invention, on said first area, a depth of the groove tracks is set to 30 nm, on said second area, the pit depth is set to 80 nm, an average duty of the pit string is set to approximately 50%, and the meandering amplitude is set so as to be approximately 2.7 times as much as that of said first area, and on said third area, the pit depth is set to 50 nm, an average duty of the pit string is set to approximately 80%, and the meandering amplitude is set to be equal to that of said first area.

According to this invention, suitable design conditions can be given particularly in the case DVD-RW is used.

The above object of the present invention can be achieved by an optical recording medium producing apparatus of the present invention for producing an optical recording medium onto which recording information can be recorded optically using an optical disc master. The apparatus is provided with: a first area forming device for cutting groove tracks meanderingly on said optical disc master using a light beam modulated by a wobble signal so as to form a first area onto which the recording information is recorded; a second area forming device for meanderingly cutting a phase pit string corresponding to control data required for reproduction control of the recording information on said optical disc master using the light beam modulated by the wobble signal so as to provide a pit depth which enables reading of the control data and which prevents reading of other data overwritten on the phase pit string, and for forming a second area; and a third area forming device for meanderingly cutting a phase pit string corresponding to predetermined data on said optical disc master using the light beam modulated by the wobble signal so as to provide a pit depth which enables reading of pre-pits including address information representing a recording position on said optical recording medium and which prevents reading of other data overwritten on the phase pit string, and for forming a third area. In addition, in said second area forming device and said third area forming device, a degree of modulation of the light beams due to the wobble signal is set so the output levels of wobble signals extracted from said respective areas are approximately equal to an output level of the wobble signal extracted from said first area at the time of reproduction from said optical recording medium produced by using said optical disc master.

According to the present invention, the first area where the groove tracks are cut, and the second area and the third area where a plurality of phase pits are formed are formed on the optical disc master to be used for producing the optical recording medium. At this time, since the light beam to be used for forming the respective areas is modulated by the wobble signal, waving patterns are formed. On the second area and the third area, even in the case where the pit depths to be cut are different, since the degree of the modulation is set suitably, the pits can be formed with waving amplitude approximately same as that of the first area as a reference. Therefore, in the optical recording medium which is producing by using a stamper, the output levels of the wobble signals from different areas can be always maintained constant so that accurate synchronous control can be performed.

In one aspect of the present invention, said first area forming device and said third area forming device form the pre-pits.

According to this aspect, the pre-pits are formed on the first and third areas. Therefore, even in the case where the phase pits on the second and third areas are formed into different pit depths according to existence/non-existence of pre-pits, in the optical recording medium which is produced by using the stamper as mentioned above, the output levels of the wobble signals from the different areas can be always maintained constant.

The above object of the present invention can be achieved by an optical recording medium producing method of the present invention for producing an optical recording medium onto which recording information can be recorded optically using an optical disc master. The method is provided with: a first area forming process of meanderingly cutting groove tracks on said optical disc master using a light beam modulated by a wobble signal so as to form a first area on which the recording information is recorded; a second area forming process of meanderingly cutting a phase pit string corresponding to control data required for reproduction control of the recording information on said optical disc master using the light beam modulated by the wobble signal so as to provide a pit depth which enables reading of the control data and which prevents reading of other data overwritten on the phase pit string, and of forming a second area; and a third area forming process of meanderingly cutting a phase pit string corresponding to predetermined data on said optical disc master using the light beam modulated by the wobble signal so as to provide a pit depth which enables reading of pre-pits including address information representing a recording position on said optical recording medium and which prevents reading of other data overwritten on the phase pit string, and of forming a third area. In addition, at the second area forming process and the third area forming step, a degree of modulation of the light beam due to the wobble signal is set so that output levels of the wobble signals extracted from said respective areas are approximately equal to an output level of the wobble signal extracted from said first area.

According to the present invention, the first area where the groove tracks are cut, and the second area and the third area where a plurality of phase pits are formed are formed on the optical disc master to be used for producing the optical recording medium. At this time, since the light beam to be used for forming the respective areas is modulated by the wobble signal, waving patterns are formed. On the second area and the third area, even in the case where the pit depths to be cut are different, since the degree of the modulation is set suitably, the pits can be formed with waving amplitude approximately same as that of the first area as a reference. Therefore, in the optical recording medium which is producing by using a stamper, the output levels of the wobble signals from different areas can be always maintained constant so that accurate synchronous control can be performed.

In one aspect of the present invention, the first area forming process and the third area forming process form the pre-pits.

According to this aspect, the pre-pits are formed on the first and third areas. Therefore, even in the case where the phase pits on the second and third areas are formed into different pit depths according to existence/non-existence of pre-pits, in the optical recording medium which is produced by using the stamper as mentioned above, the output levels of the wobble signals from the different areas can be always maintained constant.

DETAILED DESCRIPTION OF THE PREFERRED EMBODIMENTS

There will be explained below the preferred embodiments of the present invention with reference to the FIGS. 1 through 14. Here, the explanation will be given as to embodiments in the case where the present invention is applied to DVD-RW as an optical recording medium on which recording information can be recorded.

Figure 1:
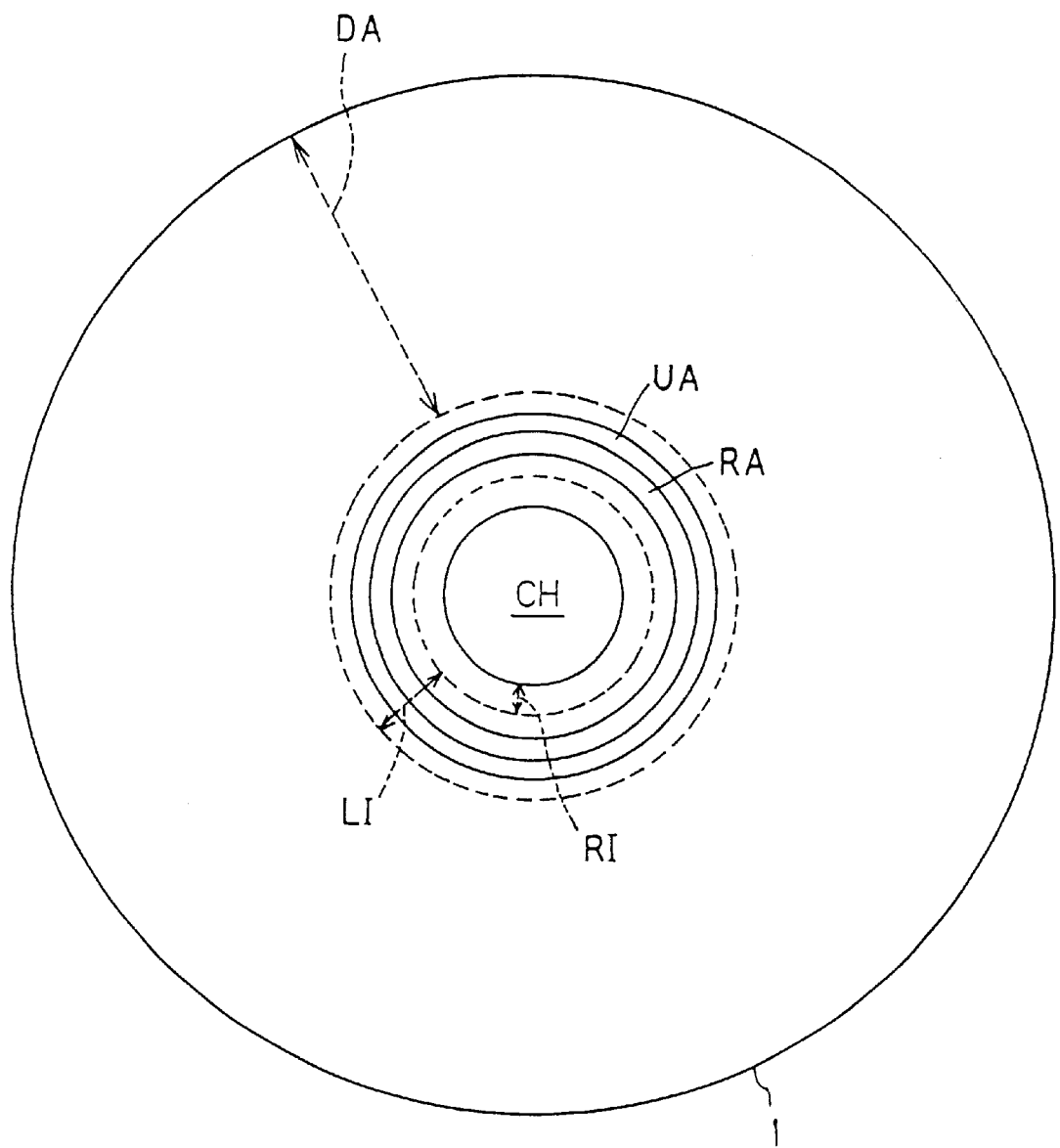
FIG. 1 is a plan view of DVD-RW according to an embodiment of the present invention.

FIG. 1 is a plan view of DVD-RW according to the embodiment and a plan view at the time of shipment of DVD-RW. As shown in FIG. 1, in a DVD-RW 1 of the embodiment, a clamp hole CH which is used for fixing to a spindle motor of an information recording apparatus (not shown) for recording recording information onto the DVD-RW 1 on the shipment is made at its center. Moreover, in the DVD-RW 1, a second area (reproduction exclusive area RA) into which an emboss pit string corresponding to control data required for reproduction control of the recording information is embedded, and a third area (impossible area UA) into which an emboss pit string corresponding to predetermined data is embedded are formed concentrically. According to the embodiment, the control data can be read from the emboss pit string on the reproduction exclusive area RA, and the predetermined data cannot be read from the emboss bit string on the impossible area UA. As mentioned above, the reproduction exclusive area RA and the impossible area UA are areas on the DVD-RW 1 which correspond to recording areas of the reproduction control information or the like in DVD-ROM and prevent illegal copying on the DVD-RW 1, and they are areas where another control data cannot be overwritten.

In the case where recording information is recorded onto the DVD-RW 1 in the information recording apparatus, after an initializing process is first executed, a control information area RI, a lead-in area L1 and a recording area DA as a first area of the present invention are formed on the DVD-RW 1 successively from an inner peripheral side as shown by a broken line in FIG. 1.

Control information which is used for recording and reproducing recording information on/from the DVD-RW 1 is recorded onto the control information area R1 at the time of initialization. Examples of the concrete control information include setting information of intensity of a light beam for recording and reproduction, and recording control information to be used for recording. Starting information which shows starting of recording and reproduction is recorded on the lead-in area L1 at the time of initialization. The recording area DA is an area for actually recording recording information such as various contents on the DVD-RW 1. In FIG. 1, partition lines of the reproduction exclusive area RA and the impossible area UA already formed at the time of shipment are shown by solid lines, and partition lines of the control information area RI, the lead-in area LI and the recording area DA to be formed after initialization are shown by broken lines.

At the time when the initializing process on the DVD-RW 1 is completed, the reproduction exclusive area RA and the impossible area UA are included in the lead-in area LI. Moreover, when the recording of the recording information on the whole DVD-RW 1 is completed, a lead-out area where end information showing completion of recording is formed on an outermost peripheral portion of the recording area DA.

Figure 2A:
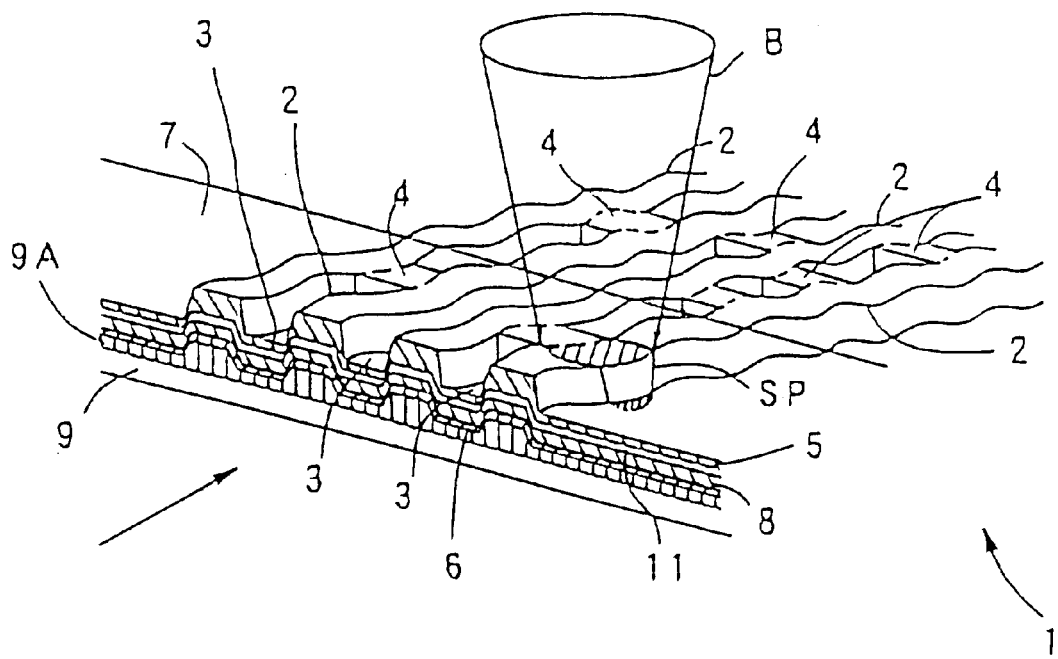
FIG. 2A is a perspective view showing a structure of the DVD-RW on which pre-pits are formed.
Figure 2B:
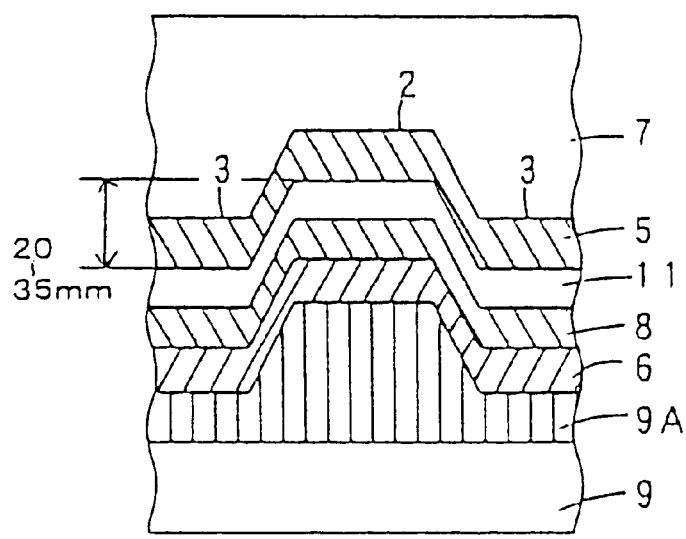
FIG. 2B is a cross section view showing a structure of the DVD-RW on which pre-pits are formed.

FIG. 2 is a cross section showing a structure of the DVD-RW 1 where pre-pits, mentioned later, are formed. FIG. 2A is a perspective view showing the structure of the DVD-RW 1 on the recording area DA, and FIG. 2B is a cross section that a groove track is viewed from a direction of an arrow in FIG. 2A.

In the DVD-RW 1, pre-pits 4 are formed on land tracks 3 in the areas except for the reproduction exclusive area RA at the time of shipment. On the pre-pits 4, address information showing recording positions at the time of recording onto the DVD-RW 1 is recorded as pre-information.

In addition, the groove tracks 2 of the DVD-RW 1 are wobbled so that a wobble signal which is used for synchronous control of the whole recording operation such as rotation control is generated at the time of shipment. Namely, the groove tracks 2 which wave at constant cycle are previously formed on the DVD-RW 1.

In FIGS. 2A and 2B, the DVD-RW 1 is a phase-changing type optical disc having a recording layer 11 composed of a phase-changing thin film, and the groove tracks 2 as recording tracks and the land tracks 3 as guide tracks which are adjacent to the groove tracks 2 are formed on a substrate 9 alternatively. A light beam B with wavelength of 650 nm is emitted onto the groove tracks 2 at the time of reproduction or recording, and the light beam B can be guided to the groove tracks 2 by function of the land tracks 3.

As shown in FIG. 2B, the groove track 2 has a cross sectional structure such that a resin layer 9A, a reflection layer 6, a protective layer 8, the recording layer 11, a protective layer 5 and a protective film 7 are laminated in this order on the substrate 9. The protective layers 5 and 8 are arranged so as to sandwich the recording layer 11, and they protect the recording layer 11. The reflection layer 6 reflects the emitted light beam B. The protective film 7 and the resin layer 9A are provided so as to protect the above respective layers from external air and the like.

At this time, a depth of the groove track 2 is not less than 20 nm to not more than 35 nm in the position of the recording layer 11, and an interval between center lines of the adjacent two groove tracks 2 is 0.74 μm.

Meanwhile, as mentioned above, the pre-pits 4 corresponding to the pre-information are formed on the land tracks 3 at the stage of shipment. When the information recording apparatus records recording information onto the DVD-RW 1, the pre-pits 4 are detected so that the pre-information previously recorded is obtained in a manner, mentioned below. An optimal output or the like of the light beam B is set based on the pre-information so as to be recorded on a predetermined recording position of the recording information based on address information as the pre-information.

In addition, as shown in FIG. 2A, the groove tracks 2 are formed meanderingly so as to be wobbled. A wobble signal which is extracted based on the wobbling of the groove tracks 2 is a periodic signal of comparatively low frequency (concretely, 140 kHz). Moreover, since a wobbling amplitude as a waving amplitude of the groove tracks 2 is maintained constant, the level of the extracted wobble signal becomes constant. When the information recording apparatus records the recording information onto the DVD-RW 1, the wobble signal is extracted from a detection signal of the groove track 2. This wobble signal is used as a synchronizing reference so as to control the whole operation of the DVD-RW 1.

Here, as shown in FIG. 2A, when recording information is recorded on the DVD-RW 1, the light beam B is emitted so that it traces a center of the groove track 2, and phase-changing pits are formed into a predetermined pattern on the groove track 2 so that the recording information is recorded.

At this time, the size of an optical spot SP formed by the light beam B is, as shown in FIG. 2A, set so that the optical spot SP is emitted onto the groove track 2 and a portion of the optical spot SP can be emitted the land track 3. According to a push-pull method (a radial push-pull method using a photo detector divided by dividing lines parallel with a rotational direction of the DVD-RW 1), a reflected light of the optical spot SP is used and pre-information of the pre-pits 4 is detected. Tracking servo control for letting the light beam B follow the groove tracks 2 is also made by the push-pull method.

Figure 3:
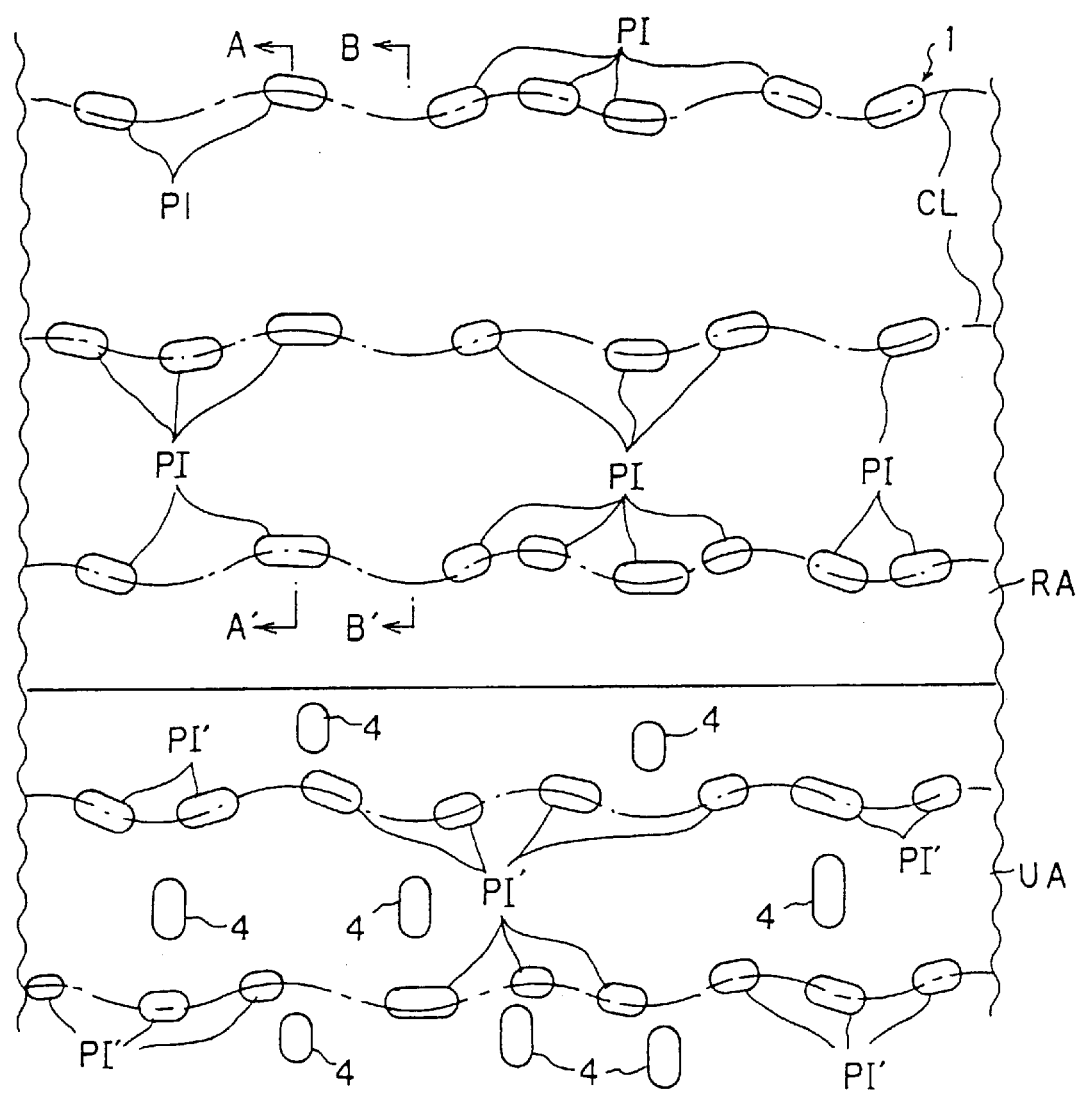
FIG. 3 is an enlarged plan view showing a structure of a reproduction exclusive area and an impossible area.
Figure 4A:
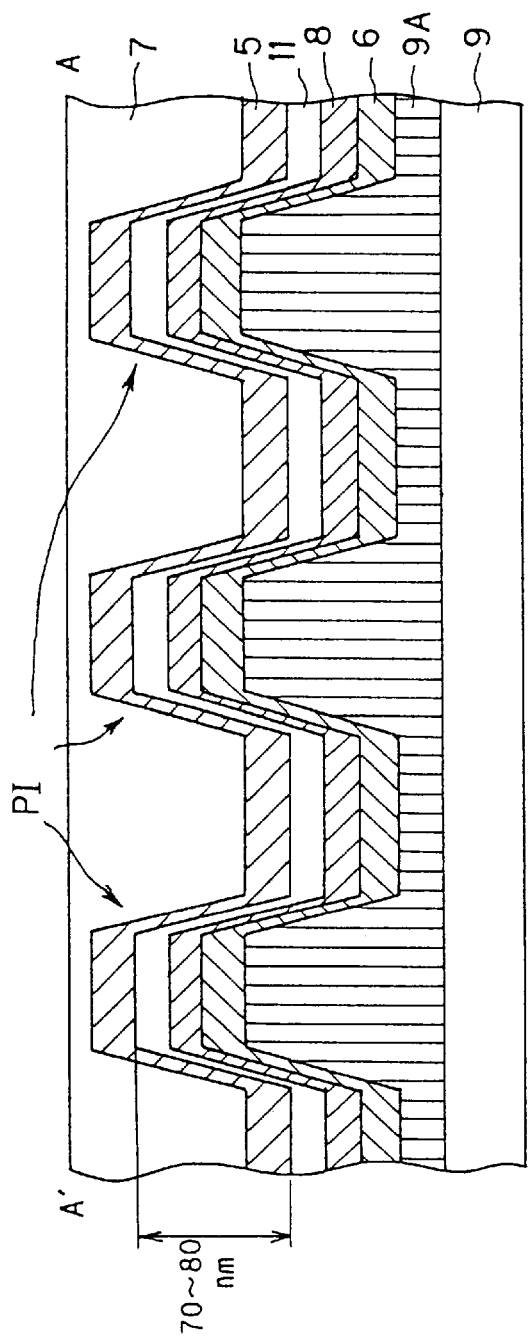
FIG. 4A is a cross section view showing a portion of the reproduction exclusive area where phase pits are formed.

Next, there will be explained below a structure of the reproduction exclusive area RA formed on the DVD-RW 1 with reference to FIGS. 3 and 4. FIG. 3 is an enlarged plan view showing a structure in the vicinity of a boundary between the reproduction exclusive area RA and the impossible area UA. FIG. 4A is a cross section view of the reproduction exclusive area RA taken along the line A–A' of FIG. 3, and FIG. 4B is a cross section view of the reproduction exclusive area RA taken along the line B–B' of FIG. 3. Here, FIG. 4A is a cross section view corresponding to FIG. 2A, and FIG. 4B is a cross section view corresponding to FIG. 2B.

In the reproduction exclusive area RA, the continuous groove tracks 2 and land tracks 3 shown in FIG. 2 are not formed. Meanwhile, as shown in FIG. 3, a plurality of phase pits PI as the emboss pit string for reproduction control information or the like to be used for reproduction of the DVD-RW 1 are formed on the reproduction exclusive area RA. The level of the reflected light changes because of diffraction caused by the phase pits PI when the light beam B is emitted to the pits so that existence or absence of the phase pits PI is discriminated and the reproduction control information or the like can be detected.

As shown in FIG. 3, due to the phase pits PI formed on the reproduction exclusive area RA, the pit strings which are arranged intermittently along the center line CL are arranged meanderingly, and they are wobbled with constant period. A period that the pit strings of the phase pits PI meander is set similarly to the wobbling period of the groove tracks 2 shown in FIG. 2. Moreover, a wobbling amplitude of the pit string of the phase pits PI is set suitably taking the level of the wobble signal into consideration as mentioned later. Also in the case where the pit string of the phase pits PI on the reproduction exclusive area RA is traced, the wobble signal can be extracted.

Here, the depth of the phase pits PI on the reproduction exclusive area RA is set in a range of 60 nm to 90 nm in the position of the recording layer 11 so that the control data can be read and reading of another control data overwritten on the phase pit string is prevented. Moreover, an interval of the center lines of the phase pits PI adjacent to each other in a radial direction of the DVD-RW 1 is set to 0.74 μm similarly to the case of the groove tracks 2. In the present embodiment, the depth of the phase pits PI is set suitably so that the level of the wobble signal based on the pit string of the phase pits PI on the reproduction exclusive area RA becomes similar to the level of the wobble signal based on the wobbling of the groove tracks 2, but the details will be mentioned later.

Figure 4B:
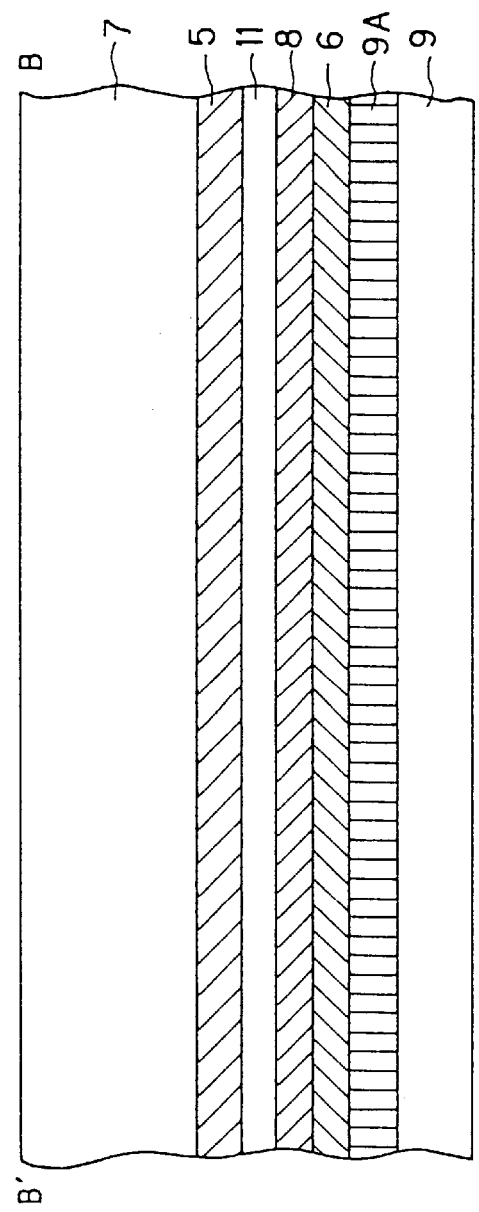
FIG. 4B is a cross section view showing a portion of the reproduction exclusive area where phase pits are not formed.

Here, a portion on the reproduction exclusive area RA where the phase pits PI are not formed is completely a plane as shown in FIG. 4B.

In addition, the pre-pits 4 are not formed on the reproduction exclusive area RA. This is because, as mentioned later, the phase pits PI and the pre-pits 4 are formed so as to have the same depth, and thus when both of them exist on one area, they optically interferes with each other and the detection of them is difficult.

Next, there will be explained below a structure of the impossible area UA formed on the DVD-RW 1 with reference to FIG. 3. As shown in FIG. 3, the continuous groove track 2 and land track 3 are not formed on the impossible area UA similarly to the reproduction exclusive area RA. Meanwhile, a plurality of phase pits PI' as the emboss pit string are formed on the impossible area UA, and they correspond to predetermined data 8–16 modulated. Moreover, the pit string of the phase pits PI' is wobbled.

Here, a depth of the phase pits PI' on the impossible area UA is set to be not less than 20 nm and not more than 35 nm in the position of the recording layer 11 so that the pre-pits 4 can be read and reading of another control data overwritten on the phase pit string is prevented, namely, this depth is similar to the groove tracks 2. In the case where a light beam is emitted onto the recording layer 11 on the impossible area UA having such a structure so that phase-change pits are formed, due to interference with the phase pits PI' above the phase-change pits, contents of the phase-change pits cannot be detected.

Here, address information is recorded on the impossible area UA by the pre-pits 4. Therefore, before the light beam B for recording reaches the recording area DA according to the rotation of the DVD-RW 1 at the time of recording, the recording position on the DVD-RW 1 can be known in the information recording apparatus.

Figure 5:
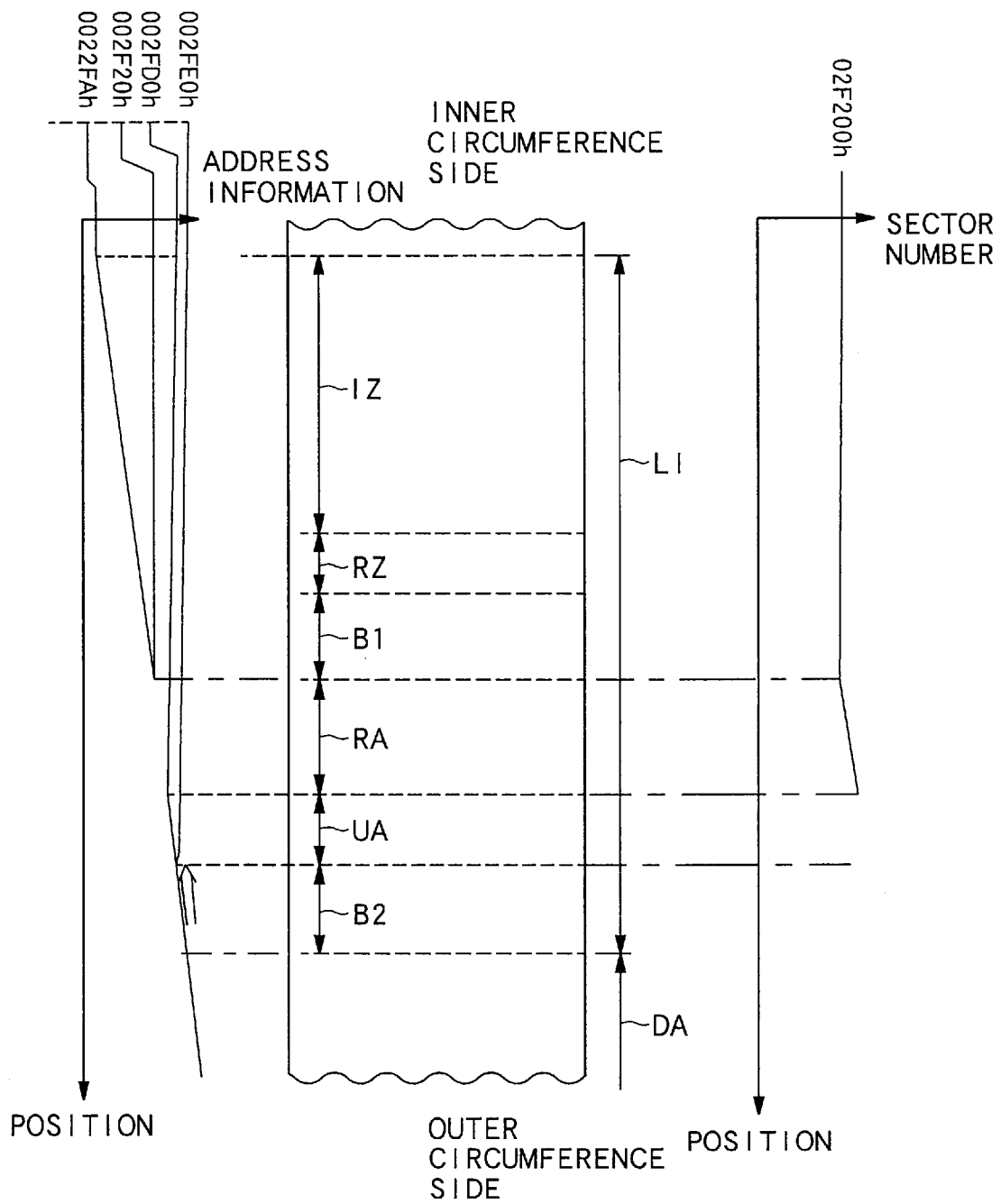
FIG. 5 is a diagram showing one portion of a recording format in the DVD-RW according to the present embodiment.

Next, there will be explained below a recording format in the DVD-RW 1 according to the present embodiment with reference to FIG. 5. FIG. 5 is a diagram showing one part of the recording format of the DVD-RW 1 after the lead-in area LI and the recording area DA are formed.

As shown in FIG. 5, after the above-mentioned initializing process is executed, an initial zone IZ, a reference code zone RZ, a first buffer zone B1, the reproduction exclusive area RA, the impossible area UA and a second buffer zone B2 are formed on the lead-in area LI in this order from its inner peripheral side. Zero data are recorded on all bit strings of the initial zone IZ, the first buffer zone B1 and the second buffer zone B2. Moreover, reference codes including the starting information or the like are recorded on the reference code zone RZ.

As shown on the left side of FIG. 5, the address information on the pre-pits 4 is set so that the address information of the initial zone IZ, the reference code zone RZ and the first buffer zone B1 are successively incremented from the inner peripheral edge. On the contrary, the address information on the pre-pits 4 is set so that the address information of the impossible area UA and the second buffer zone B2 are successively decremented from the innermost peripheral portion of the recording area DA (outermost peripheral portion of the second buffer zone B2). As mentioned above, since address information is not set on the reproduction exclusive area RA where the pre-pits 4 are not formed, address information is set discontinuously before and after the reproduction exclusive area RA.

Meanwhile, sector numbers corresponding to the DVD format are set as shown on the right side of FIG. 5. Namely, the sector numbers are previously recorded on the reproduction exclusive area RA by the phase pits PI at the time of shipment. On the contrary, the sector numbers which are continuously arranged after initialization are set on the lead-in area LI except for the reproduction exclusive area RA and the impossible area UA. At this time, the sector numbers are set on the impossible area UA so as to change continuously between its innermost peripheral portion and its outermost peripheral portion.

Figure 6:
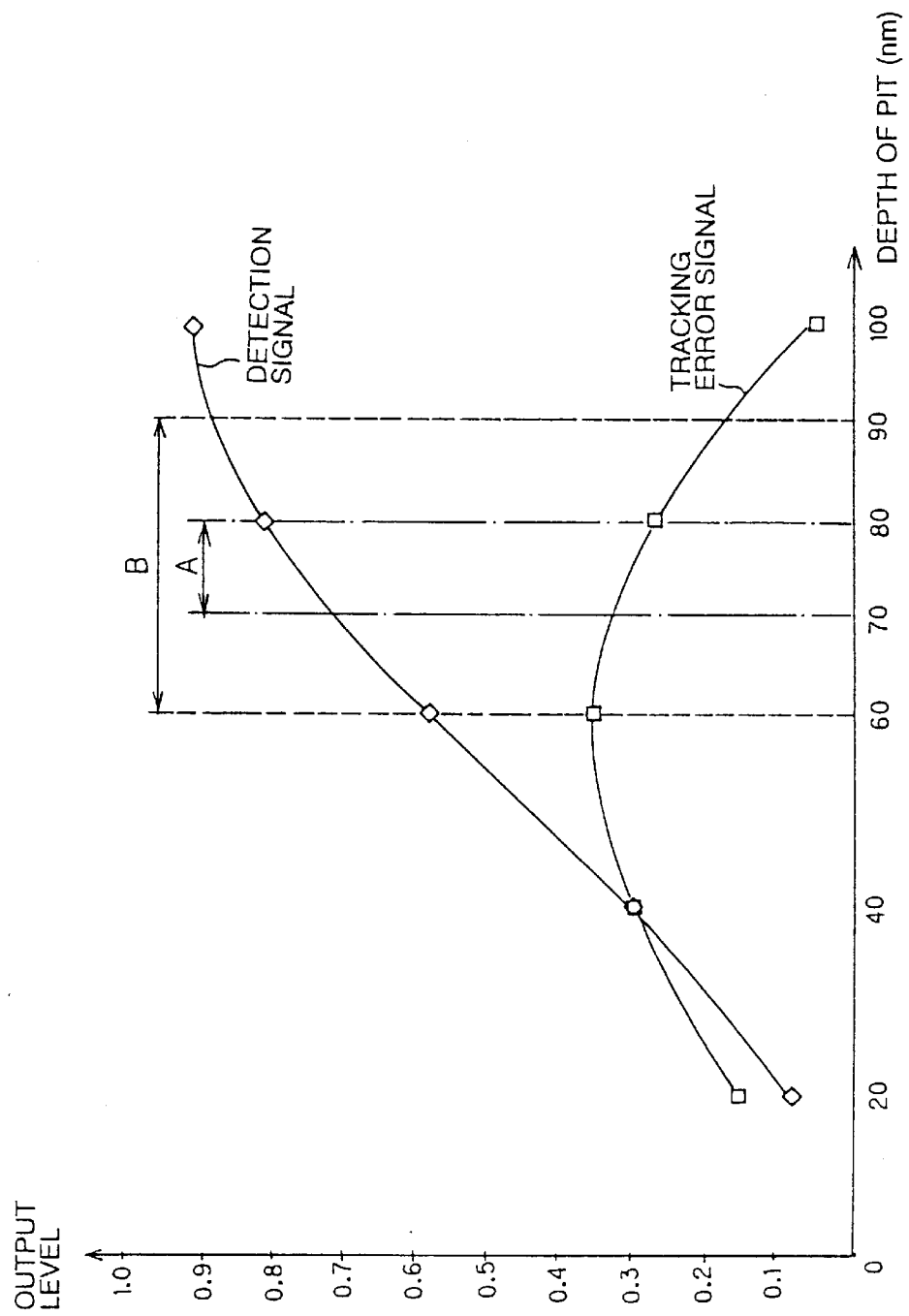
FIG. 6 is a diagram showing an experimental result corresponding to the present embodiment.

Next, there will be explained below a relationship between the depth of the phase pits PI and optical characteristics on the reproduction exclusive area RA with reference to FIG. 6. FIG. 6 shows an experimental result of a relationship among the depth of the phase pits PI of the reproduction exclusive area RA and an output level of a detection signal detected from the phase pits PI and an output level of a tracking error signal based on the push-pull method.

As mentioned above, in order to detect the sector information or the like recorded by the phase pits while the tracking servo control is being accurately made on the reproduction exclusive area RA, it is necessary to detect the detection signal and the tracking error signal at satisfactory output level. In FIG. 6, in order to set the output levels of the detection signal and the tracking error signal in the allowable range, it is necessary to set the depth of the phase pits PI to not less than 60 nm and not more than 90 nm (area B in FIG. 6). Moreover, when the depth of the phase pits PI is set to not less than 70 nm to not more than 80 nm (area A in FIG. 6), the output levels of the detection signal and the tracking error signal can be further optimized.

Figure 7:
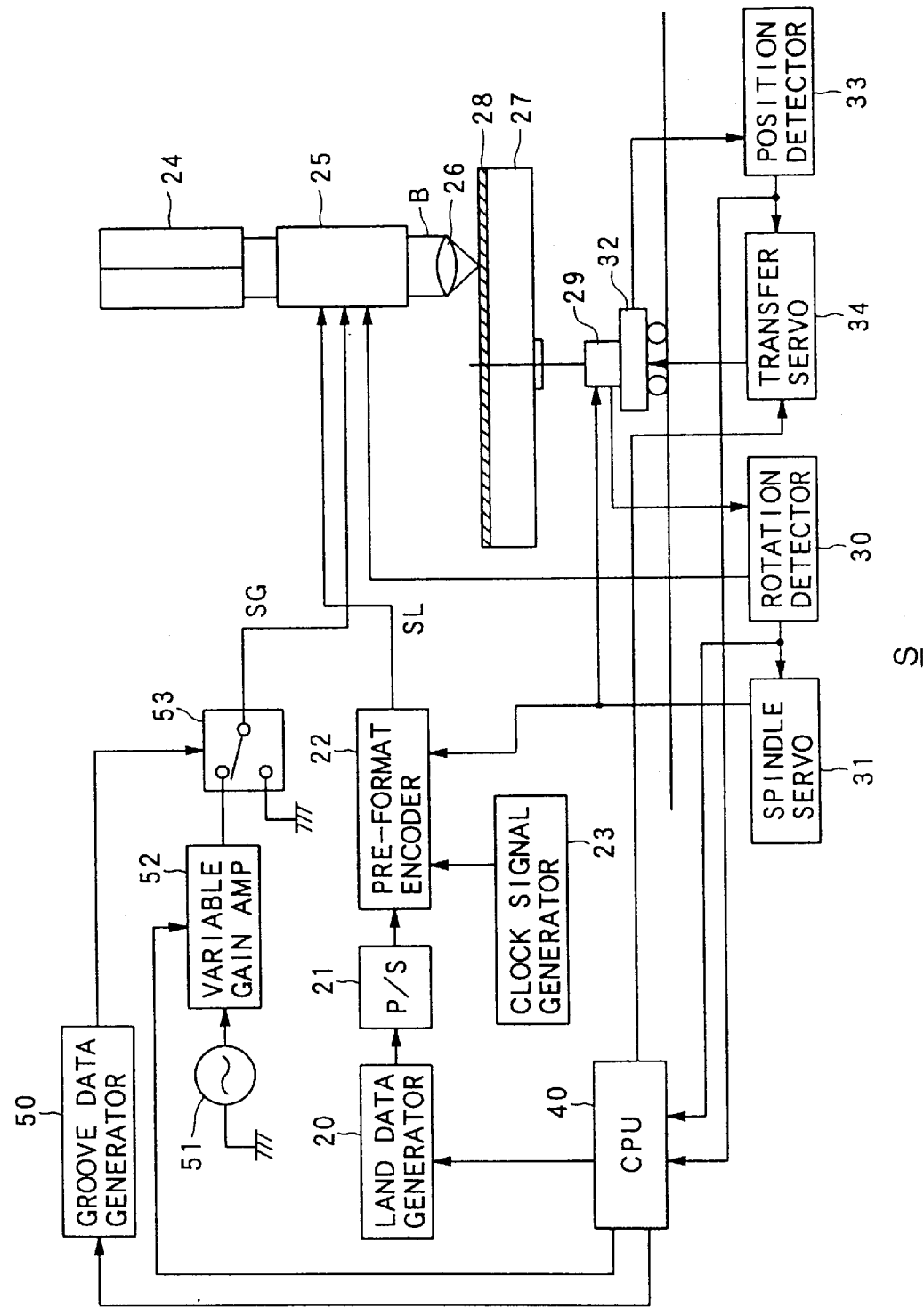
FIG. 7 is a block diagram showing a schematic structure of a cutting device according to the present embodiment.

Next, there will be explained below a cutting device S for producing the DVD-RW 1 having the above structure with reference to FIG. 7. FIG. 7 is a block diagram showing a schematic structure of the cutting device according to the present embodiment.

As shown in FIG. 7, the cutting device according to the present embodiment is composed of a land data generator 20, a parallel/serial converter 21, a pre-format-use encoder 22, a clock signal generating section 23, a laser generating device 24, a light modulator 25, an objective lens 26, a spindle motor 29, a rotation detector 30, a rotational servo circuit 31, a feed unit 32, a position detector 33, a feed servo circuit 34, a CPU 40, a groove data generator 50, a wobble signal generator 51, a variable gain amplifier 52 and a switch 53.

In addition, an optical disc master is composed of a glass substrate 27, and a resist 28 coated on the glass substrate 27. The resist 28 is exposed to light beams BG and BL, mentioned later, and pits whose forms correspond to changes in the intensity of the light beams BG and BL are formed.

In FIG. 7, the land data generator 20 outputs parallel data corresponding to a pattern of the pre-pits 4 formed on the land tracks 3 under control by means of CPU 40. The output parallel data are converted into serial data by the parallel/serial converter 21. The serial data are input into the pre-format-use encoder 22, and a land data signal SL for actually forming the land tracks 3 and the pre-pits 4 on the optical disc master is generated based on a pre-formatting clock signal supplied from the clock signal generating section 23 so as to be output to the light modulator 25.

Meanwhile, the groove data generator 50 generates groove data corresponding to the groove track 2 or the patterns of the phase pits PI and PI' to be previously formed under control by means of the CPU 40 so as to output the groove data as a control signal for the switch 53.

In addition, the wobble signal generator 51 generates a wobble signal for wobbling the groove tracks 2. The wobble signal is amplified by the variable gain amplifier 52 according to predetermined wobble gain based on control by means of the CPU 40 so as to be output to the switch 53.

The wobble signal to which the gain was added and the grand level are input into the switch 53, and switch control is performed based on the groove data output from the groove data generator 50. As a result, a groove data signal SG for actually forming a format of the groove tracks 2 on the optical disc master is output to the light modulator 25.

The laser generating device 24 emits a first light beam BG for forming groove tracks and a second light beam BL for forming pre-pits 4 of the land tracks 3 onto the optical disc master. The light modulator 25 modulates the first light beam BG based on the groove data signal SG, whereas modulates the second light beam BL based on the land data signal SL. Further, a laser power in the laser generating device 24 is controlled at predetermined timing according to control by means of the CPU 40. The light beams BG and BL are condensed on the optical disc master via the objective lens 26.

At this time, the spindle motor 29 rotates the optical disc master, and the rotation detector 30 detects rotation of the optical disc master. As a result, the rotation servo circuit 31 controls the rotation of the optical disc master, and outputs a rotation pulse which synchronizes with the rotation.

The position detector 33 detects a position of the feed unit 32, and outputs the detection signal to the feed servo circuit 34. The feed servo circuit 34 obtains position information of the feed unit 32 based on the detection signal from the position detector 33 so as to servo-control transfer of the feed unit 32.

When the above operation is performed, a convex-concave form corresponding to spiral tracks and emboss pit string are formed on the optical disc master so that a stamper disc as a trimming die for producing an optical disc is formed based on the optical disc master. Thereafter, a replication process using the stamper disc is executed so that the DVD-RW 1 as a replica disc of the present invention is mass-produced.

Figure 9:
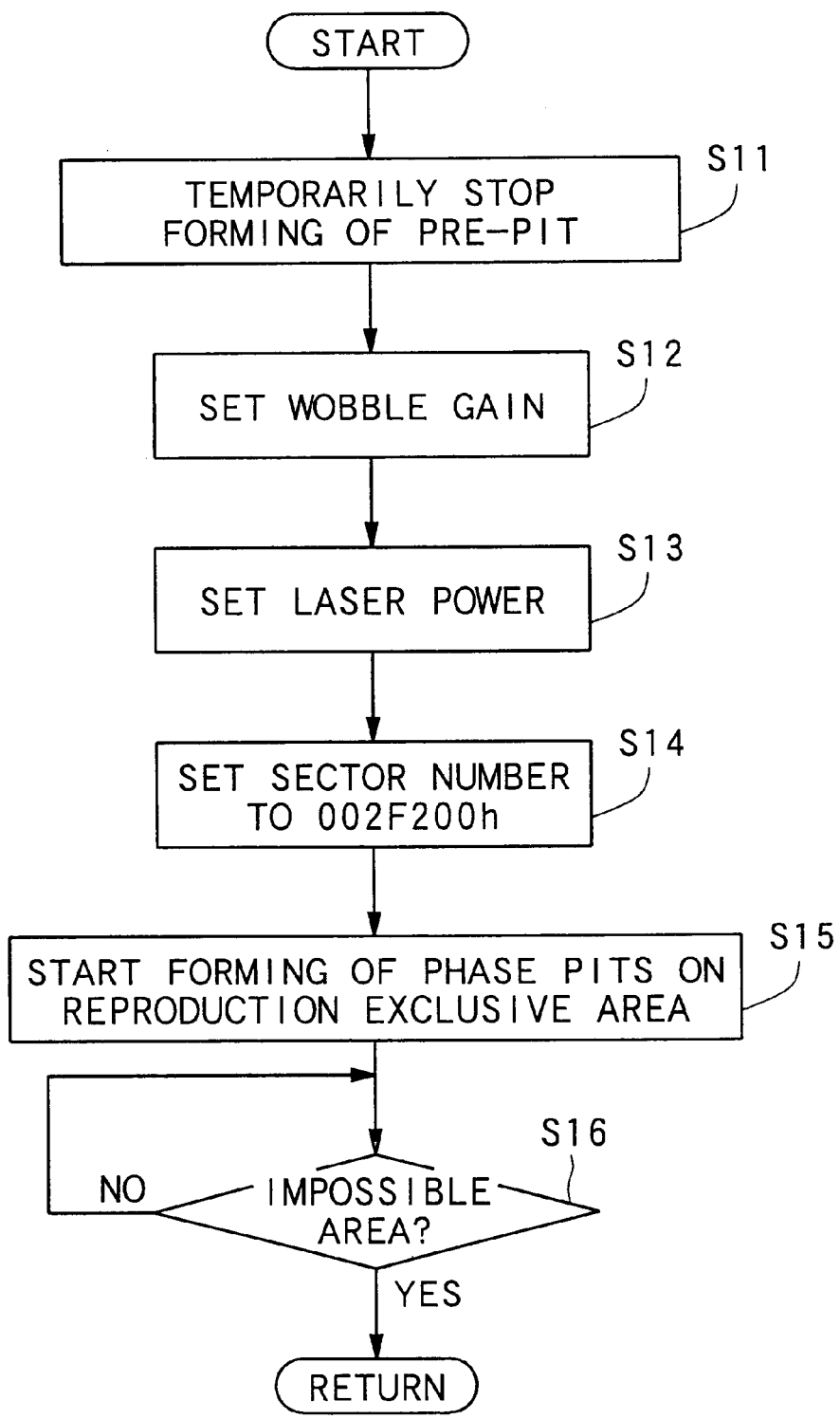
FIG. 9 is a flowchart showing a process of forming a reproduction exclusive area in the cutting process of the optical disc master executed in the cutting device according to the present embodiment.
Figure 10:
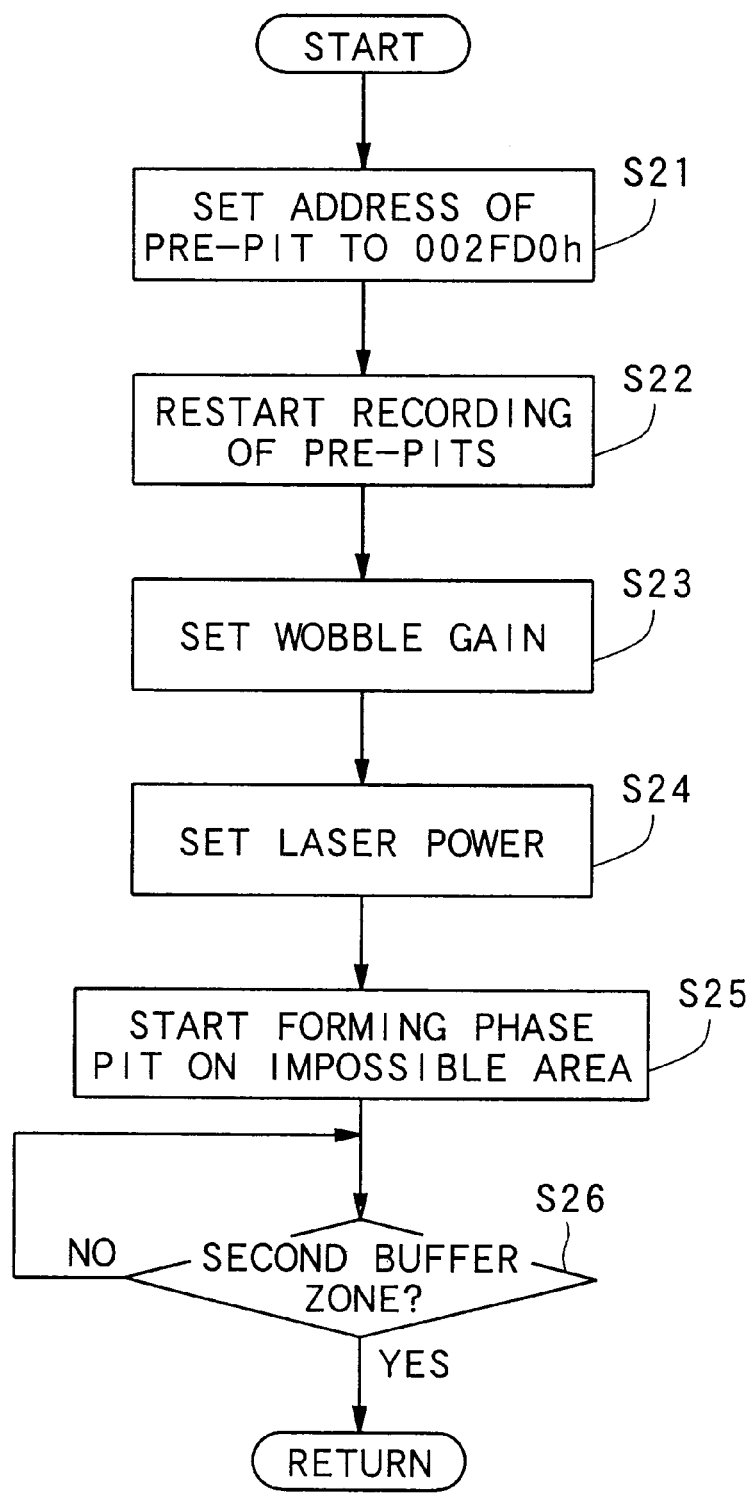
FIG. 10 is a flowchart showing a process of forming an impossible area in the cutting process of the optical disc master executed in the cutting device according to the present embodiment.

Next, there will be explained below the process of cutting the optical disc master executed in the cutting device according to the present embodiment with reference to flowcharts in FIGS. 8 through 10. Here, this process is executed mainly by the CPU 40 according to control program stored in a memory device (not shown).

Figure 8:
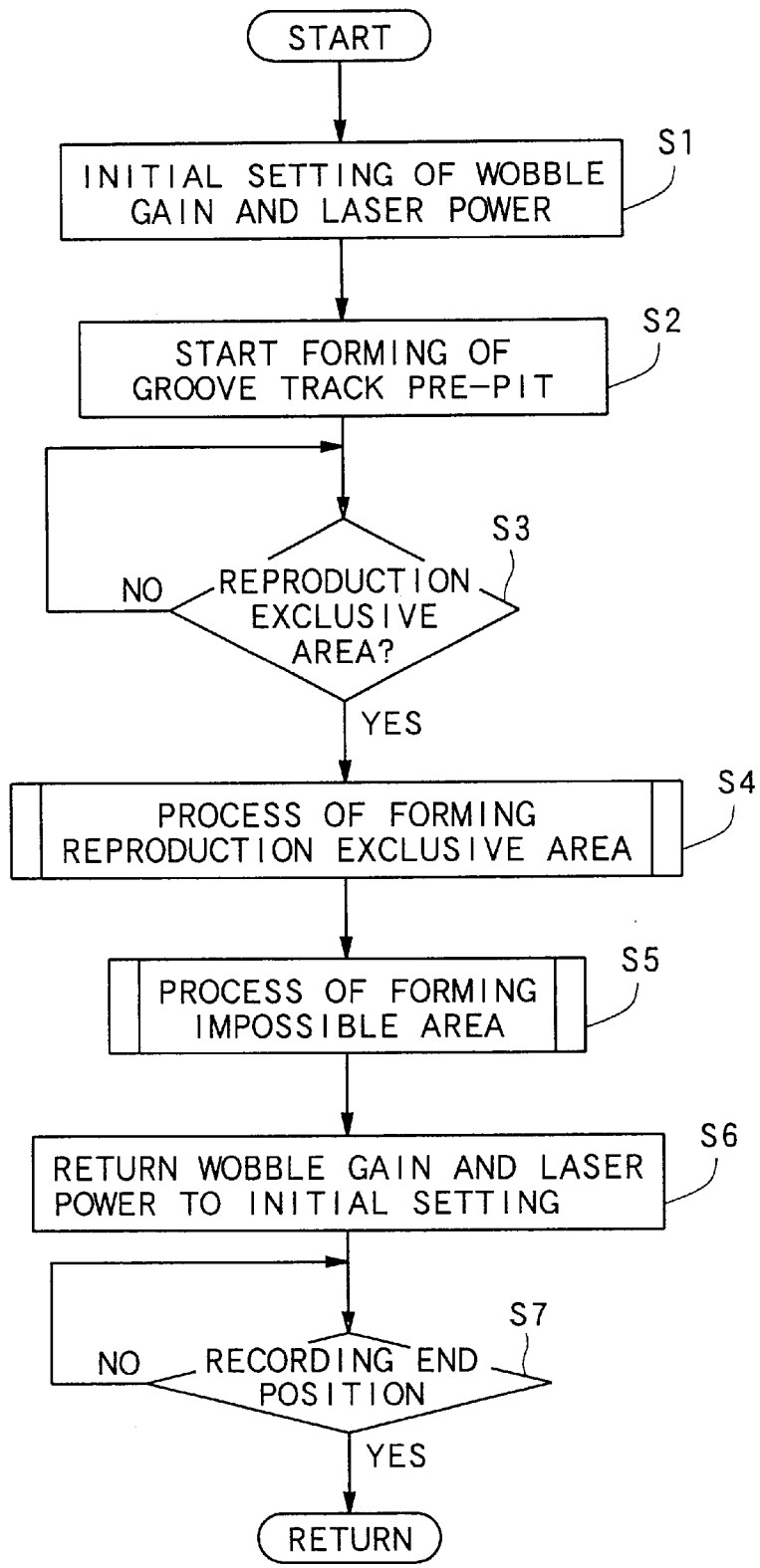
FIG. 8 is a flowchart showing a cutting process of an optical disc master executed in the cutting device according to the present embodiment.

As shown in FIG. 8, when the process in the cutting device is started, the wobble gain in the variable gain amplifier 52 and the laser power in the laser generating device 24 are initialized (step S1). Here, the wobble gain in the case where the groove tracks 2 are formed with a standard wobbling amount is set, and the laser power is set so that the depth of the groove tracks 2 becomes 30 nm.

Thereafter, the pre-pits 4 of the groove tracks 2 and the land tracks 3 are started to be formed on the optical disc master (step S2). Namely, while the rotation servo circuit 31 and the feed servo circuit 34 are being controlled, the laser generating device 24 is driven so that the first light beam BG and the second light beam BL are started to be emitted onto the optical disc master.

Referring to the address information to be recorded on the pre-pits 4, it is determined whether or not the light beams reach the reproduction exclusive area RA (step S3). As shown in FIG. 5, when a head address 002F20h of the reproduction exclusive area RA is detected, it is determined that the light beams reach the reproduction exclusive area RA. As a result of the determination at step S3, when the light beams reach the reproduction exclusive area RA (step S3; YES), the process of forming the reproduction exclusive area RA is executed (step S4).

There will be explained below the concrete process at step S4 with reference to FIG. 9. When the process of forming the reproduction exclusive area RA shown in FIG. 9 is started, since the pre-pits 4 do not exist on the reproduction exclusive area RA as mentioned above, the forming of the pre-pits 4 is temporarily stopped (step S11). As a result, the emission of the second light beam BL onto the optical disc master by the laser generating device 24 is stopped.

Next, the wobble gain is set so as to conform to wobbling amplitude due to the pit string of the phase pits PI on the reproduction exclusive area RA (step S12). Moreover, the laser power is set so as to conform to the depth of the phase pits PI on the reproduction exclusive area RA (step S13). The concrete setting of the wobbling amplitude and the depth of the phase pits PI on the reproduction exclusive area RA will be mentioned later.

Next, the sector number to be recorded by using the phase pits PI on the reproduction exclusive area RA is set to 002F200h (step S14). As shown in FIG. 5, this corresponds to the head sector number of the reproduction exclusive area RA.

Next, the phase pits PI are started to be formed on the reproduction exclusive area RA (step S15). As a result, the pit string of the phase pits PI is formed on the reproduction exclusive area RA so as to have predetermined wobbling amplitude and pit depth.

After step S15, referring to the above sector number, it is determined whether or not the first light beam reaches the impossible area UA (step S16). As shown in FIG. 5, when a sector number corresponding to the head address 002FD0h on the impossible area UA is detected, it is determined that the first light beam reaches the impossible area UA. As a result of the determination at step S16, when the first light beam BG reaches the impossible area UA (step S16; YES), the sequence goes to step S5 in FIG. 8.

Next, as shown in FIG. 8, the process of forming the impossible area UA is executed (step S5). There will be explained below the concrete process at step S5 with reference to FIG. 10. When the process of forming the impossible area UA shown in FIG. 10 is started, since it is necessary to form the pre-pits 4 on the impossible area UA as mentioned above, an address to be recorded by the pre-pits 4 is set to 002FD0h. As mentioned above, this corresponds to the head address on the impossible area UA.

The recording of pre-pits 4 which is temporarily stopped at step S11 is restarted (step S22). Hereinafter, the second light beam BL is emitted onto the optical disc master by the laser generating device 24.

Next, a wobble gain is set so as to conform to wobbling amplitude due to the pit string of the phase pits PI' on the impossible area UA (step S23). Moreover, a laser power is set so as to conform to the depth of the phase pits PI' on the reproduction exclusive area RA (step S24). The concrete setting of the wobbling amplitude and the depth of the phase pits PI' on the impossible area UA will be mentioned later.

Next, the phase pits PI' on the impossible area UA are started to be formed (step S25). As a result, the pit string of the phase pits PI' is formed on the impossible area UA so as to have predetermined wobbling amplitude and depth, and the pre-pits 4 for the address information are formed so as to be adjacent to the pit string.

After step S25, referring to the address information, it is determined whether or not the light beams reach the second buffer zone B2 (step S26). As shown in FIG. 5, when a head address 002FE0h of the second buffer zone B2 is detected, it is determined that the light beams reach the second buffer zone B2. As a result of the determination at step S26, when the light beams reaches the second buffer zone B2 (step S26; YES), the sequence goes to step S6 of FIG. 8.

Next, as shown in FIG. 8, the wobble gain and the laser power which were changed as mentioned above are returned to the initial set state similarly to step S1 (step S6). Hereinafter, the groove tracks 2 with standard wobbling amount and depth of 30 nm are formed.

After step S6, referring to the address information, it is determined whether or not the light beams reach a predetermined recording end position of the DVD-RW 1 (step S7). As a result, when the light beams reach the recording end position (step S7; YES), the cutting process of FIGS. 8 through 10 is ended.

CONCRETE EXAMPLES

The present embodiment will explains concrete examples relating to the reproduction exclusive area RA and the impossible area UA. In the following examples, the wobbling amplitude and the pit depth with respect to the pit strings of the phase pits PI and PI' are parameters to be set suitably so that the output levels of the wobble signals on the reproduction exclusive area RA and the impossible area UA are optimized.

Figure 11:
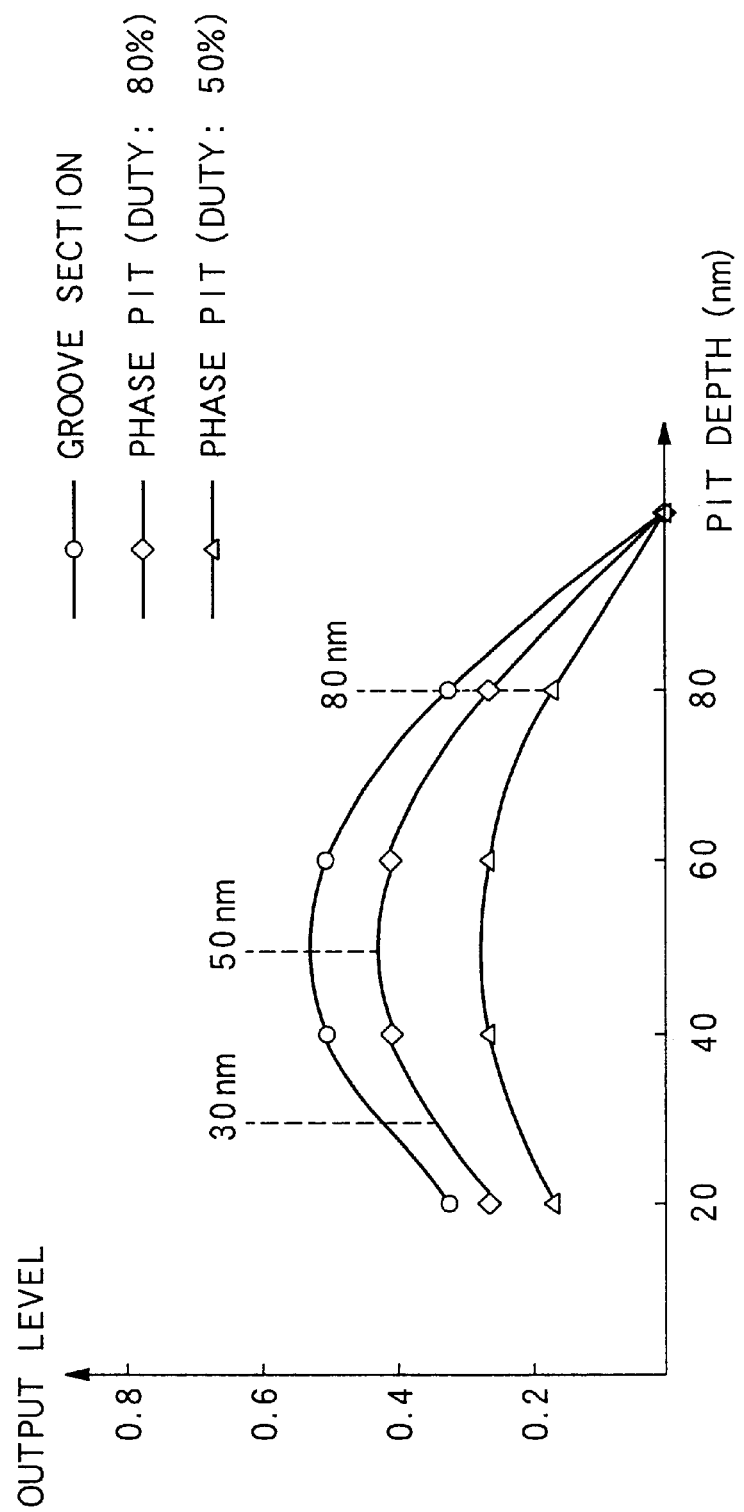
FIG. 11 is a diagram showing an example of simulation which obtains a relationship between output levels of tracking error signals and pit depths (groove depths) in simulation results corresponding to the present embodiment.
Figure 12:
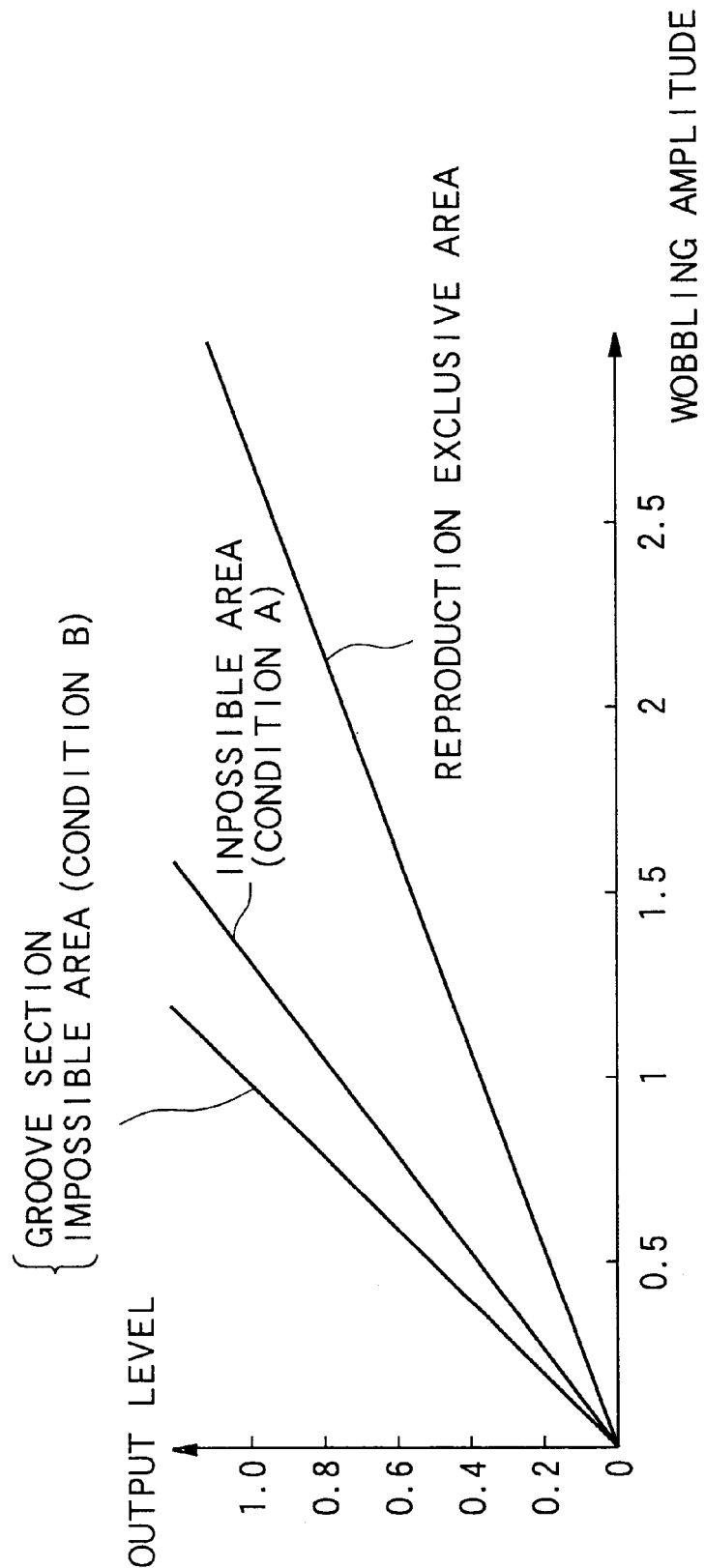
FIG. 12 is a diagram showing an example of simulation which obtains a relationship between output levels of wobble signals and wobble amplitudes in the simulation results corresponding to the present embodiment.

At first, there will be explained below a simulation result relating to the parameters and output characteristics of the wobble signals with reference to FIGS. 11 and 12. FIG. 11 is an example of simulation obtaining a relationship between the pit depth (groove depth) and an output level of a tracking error signal based on the push-pull method. Moreover, FIG. 12 is an example of simulation obtaining a relationship between the wobbling amplitude and the output levels of the wobble signals.

FIG. 11 shows comparison of characteristics among a groove section where the groove tracks 2 are formed, and two kinds of pit strings composed of phase pits with duty of 80% and duty of 50% instead of the groove tracks 2. Here, the three characteristics in FIG. 11 correspond to the case where the wobbling amplitudes have a constant value. Moreover, in FIG. 11, the axis of ordinates shows the output level of the tracking error signal, but since the output level of the wobble signal is proportional to the output level of the tracking error signal, in the case where the axis of ordinates in FIG. 11 shows the output level of the wobble signal, the similar curve is obtained.

The duty of the pit string represents an average value of proportion of the phase pit formed portion of the length in the track direction. Since the reproduction exclusive area RA where the sector information or the like is recorded has no degree of freedom in the pit arrangement, the duty is roughly assumed to be 50%. Meanwhile, on the impossible area UA in which the pit arrangement is random, the duty can be adjusted to a certain degree, and thus the duty is assumed to be 80% as a condition closer to that of the groove section. In the case of the groove section, the duty can be considered as 100%.

As is clear from FIG. 11, in the case where the pit depths (groove depth) are the same, when the duties become smaller, the output levels become smaller. This is because the phase pit portions decrease so that a phase change to be given to the emitted light beam is smaller.

In FIG. 11, the groove depth of the groove section is set to 30 nm so that it conforms to the standard. Moreover, on the reproduction exclusive area RA, the depth of the phase pits PI is set to 80 nm in the suitable range based on the optical characteristics shown in FIG. 6. On the contrary, taking the detecting performance of the pre-pits 4 into consideration, it is necessary to reduce the pit depth of the phase pits PI' on the impossible area UA. Here, the depth of the phase pits PI' on the impossible area UA is set to 30 nm and 50 nm. In FIG. 11, the positions of these set pits depths (groove depths) are represented by dotted lines.

FIG. 12 shows a change in the output level of the wobble signal when the wobbling amplitude is changed in the case where the pit depths (groove depths) are set according to the above conditions. The case where depth of the phase pits PI' on the impossible area UA is set to 30 nm corresponds to condition A, and the case where it is set to 50 nm corresponds to condition B.

As is clear from FIG. 12, the wobbling amplitudes are proportional to the output levels of the wobble signals. Moreover, even if the wobbling amplitudes are the same so as to correspond to the characteristics in FIG. 11, the output levels of the wobble signals, which are extracted based on the condition B on the groove section and the impossible area UA, the condition A on the impossible area UA and the reproduction exclusive area RA become smaller in this order. Therefore, in the present embodiment, the wobbling amplitudes are adjusted so that lowering of the output levels of the wobble signals due to a difference in the conditions shown in FIG. 12 is compensated.

Figure 13:
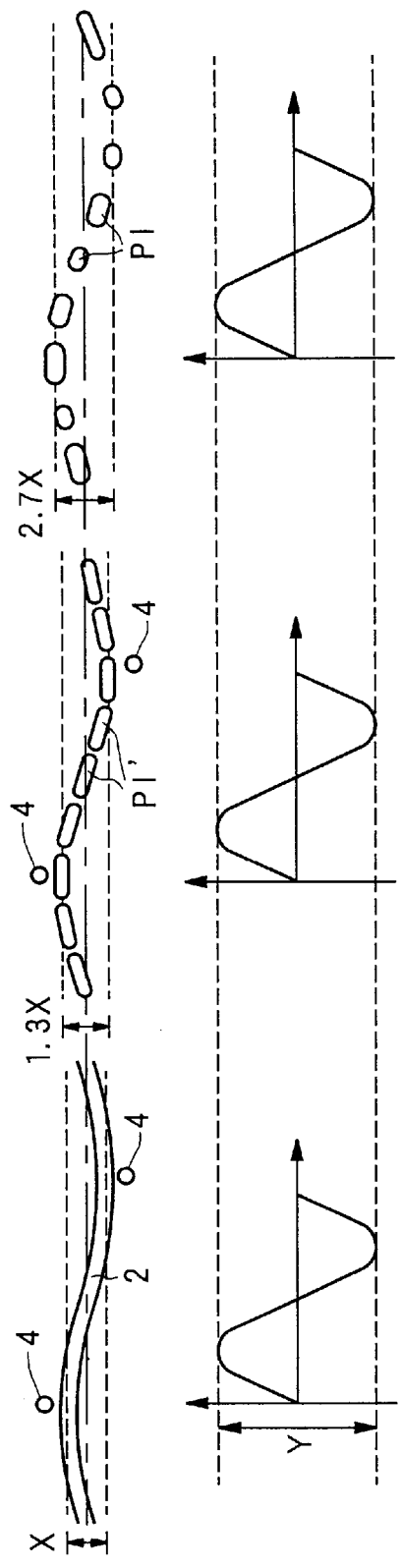
FIG. 13 is a diagram showing a structure of a first example of the DVD-RW according to the present embodiment.

There will be explained below two examples of the DVD-RW according to the present embodiment based on the above investigation with reference to FIGS. 13 and 14. FIG. 13 is a diagram showing a structure of a first example, and FIG. 14 is a diagram showing a structure of a second example.

Figure 14:
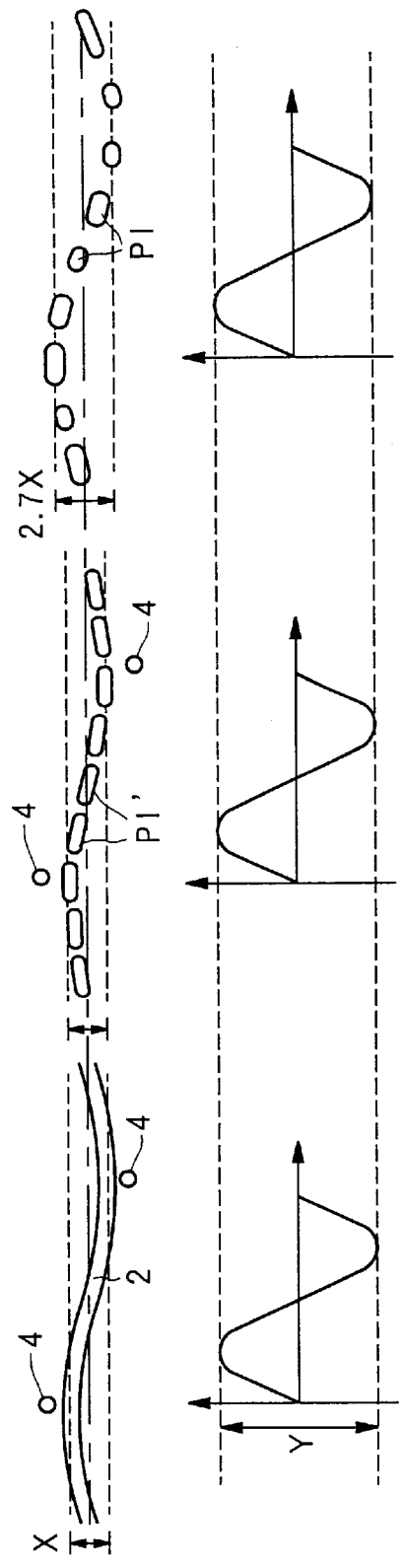
FIG. 14 is a diagram showing a structure of a second example of the DVD-RW according to the present embodiment.

In the two examples shown in FIGS. 13 and 14, the condition of the groove sections and the condition of the reproduction exclusive area RA are common. Namely, the groove depth is set to 30 nm, and the wobbling amplitude X is set to a predetermined amount which was preset as a standard. Moreover, the pit depth of the phase pits PI on the reproduction exclusive area RA is set to 80 nm, and the wobbling amplitude is set to 2.7 X under the condition that the duty is 50%.

In the first example shown in FIG. 13, the pit depth of the phase pits PI' on the impossible area UA is set to 30 nm, and the wobbling amplitude is set to 1.3 X under the condition that the duty is 80%. At this time, as shown at the lower portion of FIG. 12, the output level Y of the wobble signal extracted from the groove section is similar to the output levels Y of the wobble signals extracted from the impossible area UA and the reproduction exclusive area RA.

Next, in the second example shown in FIG. 14, the pit depth of the phase pits PI' on the impossible area UA is set to 50 nm, and the wobbling amplitude is set to X under the condition that the duty is 80%. In this case, as shown at the lower portion of FIG. 13, the output level Y of the wobble signal extracted from the groove section is similar to the output levels Y of the wobble signals extracted from the impossible area UA and the reproduction exclusive area RA.

In the first and second examples, the output levels of the wobble signals on all the areas can be the same. In the first embodiment, on the groove section and the impossible area UA, the pit depths (groove depths) are commonly set to 30 nm. Meanwhile, in the second example, on the groove section and the impossible area UA, the wobbling amplitudes X are set commonly.

As mentioned above, according to the DVD-RW 1 of the present embodiment, even in the case where the reproduction exclusive area RA and the impossible area UA for preventing illegal copying are provided, the conditions such as the pit depths and the wobbling amplitudes are set suitably, the output levels of the wobble signals based on the respective areas can be maintained constant. As a result, the synchronous control at the time of controlling recording and reproduction using the wobble signals can be stabilized.

The present invention is not limited to the above-mentioned embodiments. For example, in the above embodiments, the DVD-RW is used as the optical recording medium onto which recording information can be recorded optically, but the present invention can be applied to optical recording media such as DVD-R based on another formats.

In addition, according to the cutting device as the optical recording medium producing apparatus, the pre-pits 4 and the groove tracks 2 are cut on an optical disc master by different light beams BG and BL. However, one light beam is diffracted greatly in a radial direction of a disc by the light modulator 25 so that the pre-pits 4 can be formed. Moreover, according to the optical recording medium producing apparatus, the depths of the phase pits are changed by adjusting the power of a light beam, but the depths can be changed also by controlling the light modulator 25.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-224216 filed on Jul. 25, 2000 including the specification, claims, drawings and summary is incorporated herein by reference in its entirety.

What is claimed is:

1. An optical recording medium onto which recording information can be recorded optically, comprising:
   a first area where the recording information is recorded on groove tracks formed meanderingly so as to extract wobble signal;
   a second area where a phase pit string corresponding to control data required for reproduction control of the recording information is arranged meanderingly, the phase pit string having a pit depth so that it enables the control data to be read and reading of other data overwritten on the phase pit string is prevented; and
   a third area where a phase pit string corresponding to predetermined data is arranged meanderingly, the phase pit string having a pit depth so that it enables pre-pits including address information representing a recording position on said optical recording medium to be read and reading of other data overwritten on the phase pit string is prevented,
   wherein a meandering amplitude of said second area and a meandering amplitude of said third area are set so that output levels of wobble signals extracted from said second and third areas are approximately equal to an output level of the wobble signal extracted from said first area.

2. The optical recording medium according to claim 1, wherein the pre-pits are formed at least on said first area and said third area.

3. The optical recording medium according to claim 2, wherein the pit depth on said third area is set so as to be equal to the depth of the groove tracks of said first area.

4. The optical recording medium according to claim 3, wherein
   on said first area, a depth of the groove tracks in set to 30 nm,
   on said second area, the pit depth is set to 80 nm, an average duty of the pit string is set to approximately 50%, and the meandering amplitude is set to be approximately 2.7 times as much as that of said first area, and
   on the third area, the pit depth is set to 30 nm, an average duty of the pit string is approximately 80%, and the meandering amplitude is set to be approximately 1.3 times as much as that of said first area.

5. The optical recording medium according to claim 2, wherein the meandering amplitude of said third area is set so as to be equal to the meandering amplitude of said first area.

6. The optical recording medium according to claim 5, wherein
   on said first area, a depth of the groove tracks is set to 30 nm,
   on said second area, the pit depth is set to 80 nm, an average duty of the pit string is set to approximately 50%, and the meandering amplitude is set so as to be approximately 2.7 times as much as that of said first area, and
   on said third area, the pit depth is set to 50 nm, an average duty of the pit string is set to approximately 80%, and the meandering amplitude is set to be equal to that of said first area.

7. An optical recording medium producing apparatus for producing an optical recording medium onto which recording information can be recorded optically using an optical disc master, comprising:
   a first area forming device which cuts groove tracks meanderingly on said optical disc master using a light beam modulated by a wobble signal so as to form a first area onto which the recording information is recorded;
   a second area forming device which meanderingly cuts a phase pit string corresponding to control data required for reproduction control of the recording information on said optical disc master using the light beam modulated by the wobble signal so as to provide a pit depth which enables reading of the control data and which prevents reading of other data overwritten on the phase pit string, and forms a second area; and
   a third area forming device which meanderingly cuts a phase pit string corresponding to predetermined data on said optical disc master using the light beam modulated by the wobble signal so as to provide a pit depth which enables reading of pre-pits including address information representing a recording position on said optical recording medium and which prevents reading of other data overwritten on the phase pit string, and forms a third area,
   wherein in said second area forming device and said third area forming device, a degree of modulation of the light beams due to the wobble signal is set so the output levels of wobble signals extracted from said second and third areas are approximately equal to an output level of the wobble signal extracted from said first area at the time of reproduction from said optical recording medium produced by using said optical disc master.

8. The optical recording medium producing apparatus according to claim 7, wherein said first area forming device and said third area forming device form the pre-pits.

9. An optical recording medium producing method for producing an optical recording medium onto which recording information can be recorded optically using an optical disc master, said method comprising:
   a first area forming process of meanderingly cutting groove tracks on said optical disc master using a light beam modulated by a wobble signal so as to form a first area on which the recording information is recorded;
   a second area forming process of meanderingly cutting a phase pit string corresponding to control data required for reproduction control of the recording information on said optical disc master using the light beam modulated by the wobble signal so as to provide a pit depth which enables reading of the control data and which prevents reading of other data overwritten on the phase pit string, and of forming a second area; and
   a third area forming process of meanderingly cutting a phase pit string corresponding to predetermined data on said optical disc master using the light beam modulated by the wobble signal so as to provide a pit depth which enables reading of pre-pits including address information representing a recording position on said optical recording medium and which prevents reading of other data overwritten on the phase pit string, and of forming a third area, wherein at the second area forming process and the third area forming process, a degree of modulation of the light beam due to the wobble signal is set so that output levels of the wobble signals extracted from said second and third areas are approximately equal to an output level of the wobble signal extracted from said first area.

10. The optical recording medium producing method according to claim 9, wherein the first area forming process and the third area forming process form the pre-pits.

* * * * *